United States Patent [19]

Ackermann

[11] Patent Number: 5,555,790
[45] Date of Patent: Sep. 17, 1996

[54] MECHANICAL INTERFACE ASSEMBLY, CONTAINER INCORPORATING A MECHANICAL INTERFACE ASSEMBLY AND TRANSPORTATION TAPE FOR SINGLE-PORTIONS OF GROUND COFFEE

[75] Inventor: Anton Ackermann, Wolfwil, Switzerland

[73] Assignee: Cosmec S.R.L., Urgnano, Italy

[21] Appl. No.: 275,021

[22] Filed: Jul. 13, 1994

[30] Foreign Application Priority Data

Jul. 21, 1993 [DE] Germany ............................. 43 24 468.8
Jul. 7, 1994 [CH] Switzerland ............................... 2172/94

[51] Int. Cl.⁶ ............................................. A47J 31/00
[52] U.S. Cl. ............................. 99/289 T; 99/290; 426/77
[58] Field of Search ......................... 99/289 T, 289 R, 99/289 D, 290, 279; 426/77, 115; 206/389, 390

[56] References Cited

U.S. PATENT DOCUMENTS

| | | | |
|---|---|---|---|
| 2,939,380 | 6/1960 | Parraga | 99/289 T |
| 3,181,734 | 5/1965 | Ensign | 99/289 T |
| 3,213,777 | 10/1965 | Heier | 99/289 T |
| 3,356,011 | 12/1967 | Parraga | 99/289 T |

*Primary Examiner*—Robert W. Jenkins
*Attorney, Agent, or Firm*—Tarolli, Sundheim, Covell, Tummino & Szabo

[57] ABSTRACT

In order to feed single-portions of ground coffee arranged along a transportation tape in a defined and automatic manner to the brewing chamber of a coffee machine, the invention provides a mechanical interface assembly which comprises means for fixing a portion of the transportation tape in a well defined position. The interface assembly comprises a first interface member connected to or being part of a container receiving the transportation tape with the single-portions of ground coffee, and a second interface member designed as a supporting frame member adapted to receive the container with the transporting tape. The first and second interface members can be mechanically coupled to each other. The mechanical interface assembly is further provided with positioning elements for fixing it in the coffee machine in a well defined position. Moreover, the invention provides a container member for receiving a transportation tape equipped with a plurality of single-portions of ground coffee, which container member is adapted to cooperate with or comprises a mechanical interface member, as well as a transportation tape adapted to cooperate with a mechanical interface assembly.

31 Claims, 4 Drawing Sheets

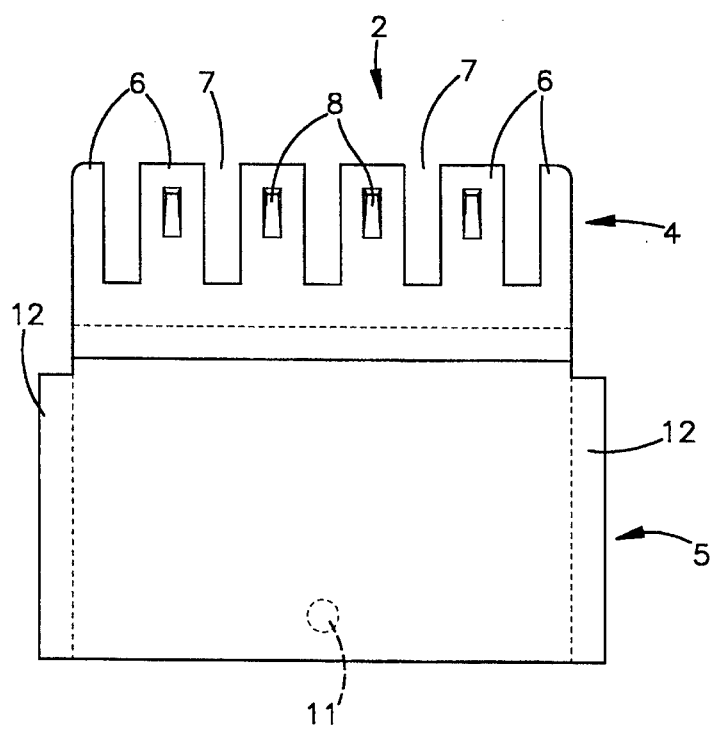
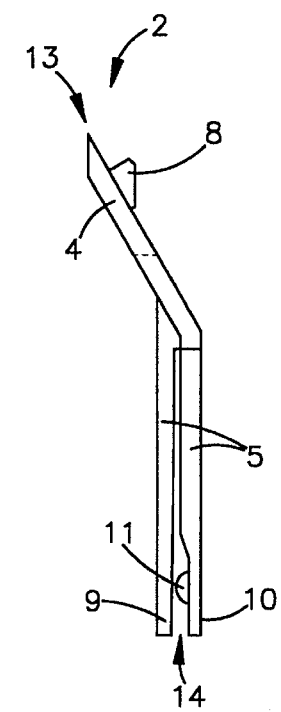
Fig.1  Fig.2
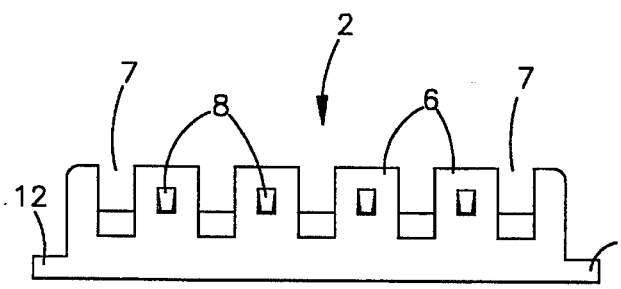
Fig.3
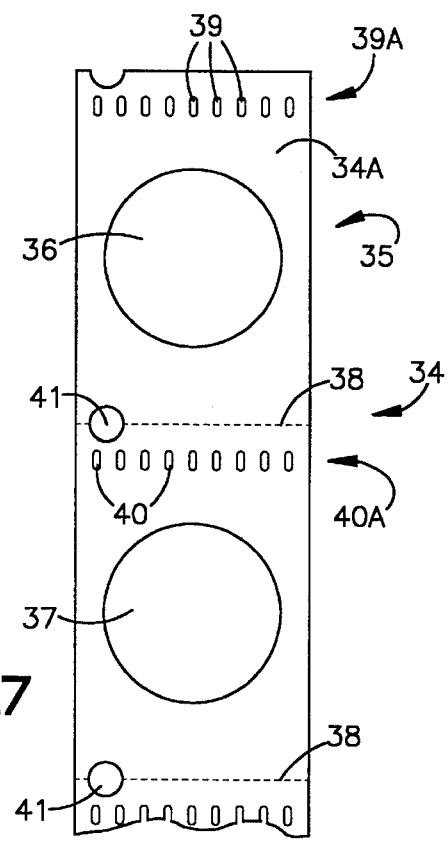
Fig.7

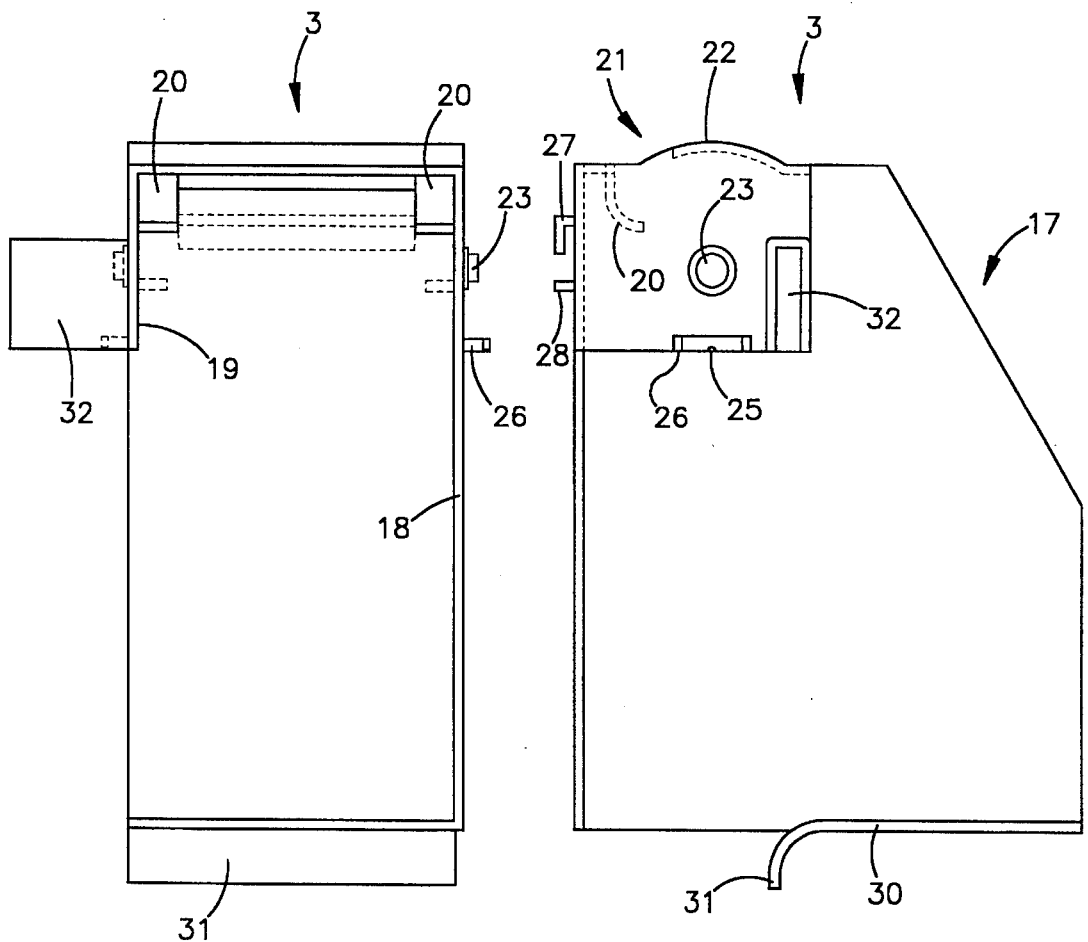
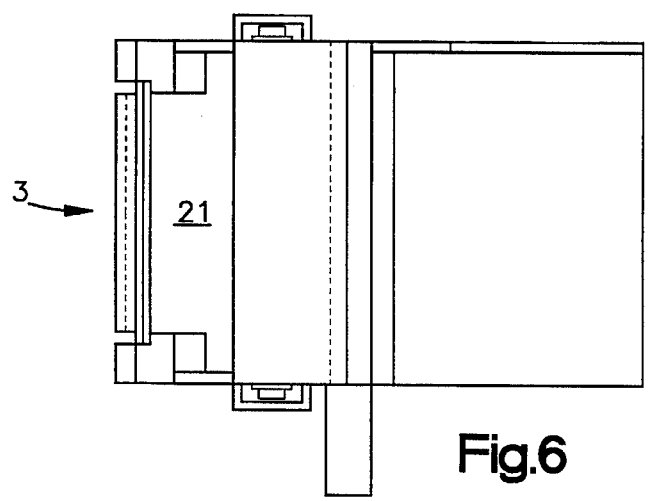

MECHANICAL INTERFACE ASSEMBLY, CONTAINER INCORPORATING A MECHANICAL INTERFACE ASSEMBLY AND TRANSPORTATION TAPE FOR SINGLE-PORTIONS OF GROUND COFFEE

FIELD OF THE INVENTION

The present invention refers to a mechanical interface assembly adapted to serve as an interface between a coffee machine and a transportation tape equipped with a plurality of single-portions of ground coffee. Moreover, the invention refers to a container member adapted to cooperate with a mechanical interface assembly adapted to serve as an interface between a coffee machine and a transportation tape equipped with a plurality of single-portions of ground coffee and received in said container member. Finally, the invention refers to a transportation tape equipped with a plurality of single-portions of ground coffee and adapted to cooperate with a mechanical interface assembly serving as the interface between the transportation tape and a coffee machine.

BACKGROUND OF THE INVENTION

For preparing a coffee beverage, usually a powder made of ground coffee beans is used. In order to brew up this coffee powder, in many cases use is made of a semi-automatic or automatic coffee machine, a so-called espresso machine, in which the coffee powder is brewed under pressure. Fully automatic espresso machines often have an integrated coffee grinder to grind the coffee beans just before the coffee powder is needed. Moreover, manually preparing a coffee beverage with the help of a filter receiving the coffee powder is well known.

In the case of a semi-automatic coffee machine, a certain amount of coffee powder is filled into a filter holder by means of a dosing mug. Then, the filter holder is inserted into the coffee machine whereby the coffee powder contained therein is compressed. Now, hot water is led under pressure through the filter holder containing the compressed coffee powder and the resulting coffee beverage is collected. Another variant for preparing a coffee beverage with the help of a semi-automatic coffee machine consists in that, instead of manually dosing a certain amount of loose coffee powder, a prepared, prepackaged single-portion of coffee powder is used. Such single-portions comprise a certain amount of industrially ground coffee powder, included in a package which can be of various design. For instance, single-portions of ground coffee are known which are received in small containers made of plastic foils, metal foils, filter paper or a combination of these materials.

The advantage of these pre-packaged single-portions of ground coffee may be seen in the fact that the desired amount of coffee powder is already measured off and ground with the help of professional coffee grinders exactly to the optimal grain size. A further essential advantage is that the coffee machine is subjected but to a slight contamination since the coffee powder does not come into direct contact with parts or elements of the coffee machine.

Disadvantageous is that the single-portions of ground coffee must be received in expensive packages since it is required that each single-portion of ground coffee must be hermetically sealed. Thus, a coffee beverage, after all, is substantially more expensive than a coffee beverage brewed with the help of conventional methods. Moreover, a fully automatic coffee machine is very difficult to design if it has to be operated with such single-portions of ground coffee, since particularly a reliably operating feeding mechanism for the single-portions is hard to realize with reasonable expenditure. Furthermore, the hermetically sealed single-portions of coffee powder must be opened prior to the brewing operation. On the other hand, if the single-portions of coffee powder are not hermetically sealed, there is a danger that atmospheric influences, particularly the oxygen and the humidity contained in the atmosphere, have a detrimental effect on the taste and the flavor of the ground coffee.

PRIOR ART

In European Patent Nr. 0,041,657, an espresso machine is disclosed which makes use of a tape member containing single-portions of ground coffee arranged therealong. The tape member is pulled into the espresso machine by means of a feeding roller member until a single-portion of ground coffee is positioned in a brewing chamber; then, the coffee beverage is prepared. The fresh single-portions of ground coffee are stored in a first container means provided for this purpose, while the used single-portions of ground coffee are received in a second container means. From the sole drawing of this patent, it cannot be seen how the first container means for storing the fresh single-portions of ground coffee is designed. Furthermore, in this patent, it is not disclosed how the beginning of the tape member containing the fresh single-portions of ground coffee is introduced into the espresso machine and how it is operatively connected to the feeding roller member. However, it is clearly evident that, during brewing a coffee beverage, at least the two fresh single-portions of ground coffee following the one which is used in the brewing chamber are no longer received in the first container means. The result is that at least these two single-portions of ground coffee are exposed to atmospheric conditions and loose their taste and flavor, particularly if a fairly long time passes between two coffee brewing operations. As it is not disclosed how the beginning of the tape member is inserted into the feeding mechanism of the espresso machine, it must be assumed that this is done manually; it is understood that this manual operation is quite cumbersome to perform. As can be seen from the sole drawing of this European Patent, the distance between the single-portions of ground coffee arranged along the tape member must be quite great to ensure that only one single-portion of ground coffee is located in the region of the brewing chamber and that the entire feeding and brewing operation can be successfully performed. This means, in turn, that the tape member itself takes up a lot of space in the first container means. Finally, in the above mentioned publication, it is not disclosed how the positioning of the single-portions of ground coffee in the brewing chamber is performed.

OBJECTS OF THE INVENTION

It is an object of the invention to provide a mechanical interface assembly adapted to serve as an interface between a coffee machine and a transportation tape equipped with a plurality of single-portions of ground coffee which avoids the disadvantages mentioned herein before.

Particularly, it is an object of the invention to provide a mechanical interface assembly adapted to serve as an interface between a coffee machine and a transportation tape equipped with a plurality of single-portions of ground coffee by means of which a simple and fully automatic insertion of the beginning of the transportation tape into a coffee machine and into a tape driving means thereof, respectively, can be performed.

It is a further object of the invention to provide a container member adapted to cooperate with or provided with a mechanical interface assembly adapted to serve as an interface between a coffee machine and a transportation tape equipped with a plurality of single-portions of ground coffee and received in the container member which allows a simple and fully automatic removal of the single-portions of ground coffee.

It is a still further object of the invention to provide a transportation tape equipped with a plurality of single-portions of ground coffee which enables the individual single-portions to be definedly grasped and conveyed.

SUMMARY OF THE INVENTION

To meet these and other objects, the invention provides, according to a first aspect, a mechanical interface assembly adapted to serve as an interface between a coffee machine and a transportation tape equipped with a plurality of single-portions of ground coffee. The mechanical interface assembly comprises means for fixing and positioning a portion of the transportation tape in a well defined position relative to the mechanical interface assembly.

Thus, if this mechanical interface assembly or a part thereof is connected to a container being filled with a plurality of single-portions of ground coffee arranged along a transportation tape, the above mentioned means for fixing and positioning a portion of the transportation tape in a well defined position relative to the mechanical interface assembly ensure that a driving member provided on the-coffee machine can grasp the beginning of the transportation tape and feed it into the coffee machine without the need to manually adjust or insert the transportation tape into the coffee machine and into its driving member, respectively.

In a preferred embodiment of the interface assembly according to the invention, cam members are provided which are adapted to cooperate with apertures provided in the transportation tape, whereby recesses are provided between the individual cam members such that a driver member of the coffee machine can reach the transportation tape through these recesses, can engage the definedly fixed and positioned transportation tape portion, and can pull it, together with a single-portion of ground coffee, into the brewing chamber of a coffee machine.

According to a further preferred embodiment of the invention, the interface assembly comprises a first interface member and a second interface member which both can be coupled to each other in a defined way. Such a subdivision of the interface assembly into two interface members may be appropriate because in this manner the first interface member can be designed as a simple, inexpensive single use article which preferably is directly fixed or integrally formed to a container member for receiving the transportation tape with the single-portions of ground coffee, while the second interface member comprises the more complex and expensive parts and elements. The second interface member is designed such that it can be used again and again. The first interface member fixed to or forming part of the container member must fulfill the only task to fix the beginning of the transportation tape in a well defined position relative to the container member and does not have a great effect on the manufacturing costs of the container member.

According to a second aspect, the invention provides a container member adapted to cooperate with or provided with a mechanical interface assembly adapted to serve as an interface between a coffee machine and a transportation tape equipped with a plurality of single-portions of ground coffee and received in the container member. The container member comprises a removal aperture for removing a single-portion of ground coffee from the container member when it is in its operative condition, whereby at least the means for fixing and positioning of a portion of the transportation tape provided on the mechanical interface assembly are located in the region of the removal aperture.

According to a preferred embodiment of the container member, the first interface member is either permanently or removably fixed to the container member. It can be brought from a rest position into an operating position and vice versa. In the operating position, the first interface member can be locked. In the rest position of the first interface member, it projects not or essentially not over the contour of the container member. Contrary, in its operating position, the first interface member or at least the means for fixing and positioning the beginning of the transportation tape project over the contour of the container member. In this way, a container member is provided which requires but few space to store because, during storage, the first interface member is in its rest position. Another advantage is that the first interface member and the means for fixing and positioning, respectively, are not freely exposed and, thus, are not subjected to the danger of damage. As soon as the first interface member is brought into its operating position, the transportation tape portion connected thereto is accessible for a driver member of the coffee machine with which the container member is to be used.

According to a third aspect, the invention provides a transportation tape equipped with a plurality of single-portions of ground coffee, adapted to cooperate with a mechanical interface assembly serving as an interface between a coffee machine and the transportation tape, comprising means for fixing and positioning a portion of the transportation tape in a well defined position relative to the mechanical interface assembly. The transportation tape comprises a plurality of apertures arranged in groups, each one of said groups of apertures being assigned to one single-portion of ground coffee.

By these measures, a portion of the transportation tape, and thereby a single-portion of ground coffee, can be fixed and positioned in a well defined position. In turn, therefore, a driver member provided in a coffee machine which makes use of such a transportation tape can definedly engage the fixed and positioned portion of the transportation tape to grasp it and to convey it without slip into the brewing chamber of the coffee machine.

In a preferred embodiment of the transportation tape, between each two adjacent single-portions of ground coffee, the transportation tape is provided with a perforation. This perforation serves for the defined cutting off of the foremost single-portion of ground coffee as soon as it is removed from the container member and safely engaged with the aforementioned driver means of the coffee machine. Thus, the single-portions of ground coffee can be arranged close to each other along the longitudinal extension of the transportation tape which decreases the space required in the container member to receive the transportation tape. Moreover, in this way, the single-portions of ground coffee can be individually removed from the container member and the fresh, unused coffee portions remain in the container member where they are protected from atmospheric influences.

BRIEF DESCRIPTION OF THE DRAWINGS

In the following, an embodiment of the invention will be further described, with reference to the accompanying drawings, in which:

FIG. 1 shows a frontal view of the first interface member of the mechanical interface assembly;

FIG. 2 shows a side view of the first interface member according to FIG. 1;

FIG. 3 shows a top view of the first interface member according to FIG. 1;

FIG. 4 shows a frontal view of the second interface member of the mechanical interface assembly, said second interface member being constituted by a supporting frame member;

FIG. 5 shows the supporting frame member in a side view;

FIG. 6 shows a top view of the supporting frame member;

FIG. 7 shows a top view of a portion of a transportation tape comprising a plurality of single-portions of ground coffee;

DETAILED DESCRIPTION OF THE PREFERRED EMBODIMENTS

Figure 8:
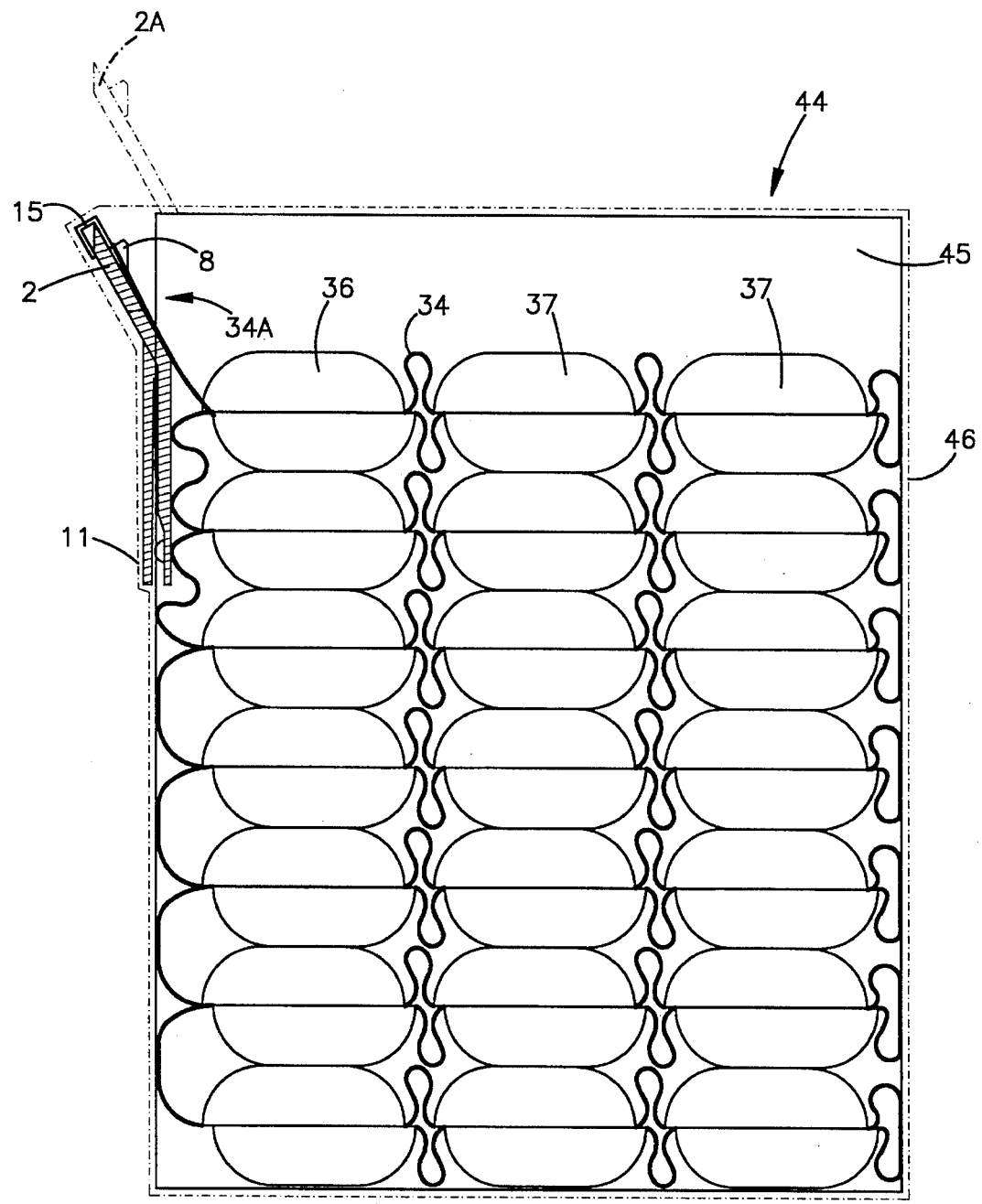
FIG. 8 shows a longitudinal sectional view of a container incorporating the first interface member fixed thereto and receiving the transportation tape comprising a plurality of single-portions of ground coffee.

In FIGS. 1–3, there is shown the first interface member 2 of the mechanical interface assembly in a frontal view, in a side view and in a top view, respectively. The interface member 2 comprises a rake-like designed upper portion 4 as well as a slotted lower portion 5 whereby said upper and lower portions include an obtuse angle. The upper portion 4 comprises a plurality of rib members 6 with a corresponding number of recesses 7 located in-between said rib members 6. In the present embodiment shown in the drawings, four of the rib members 6 of said upper portion 4 are provided with cam members 8 integrally formed with said rib members 6. The cam members 8 are aligned along a straight line. The distance between adjacent cam members 8 corresponds to twice the central distance between two adjacent transportation apertures of a transportation tape which will be further discussed herein after with reference to FIG. 7.

The rib members 6 have an acute edge at their free end portions in order to support the tearing-off of a part of the transportation tape, as will be further explained herein after. The lower portion 5 of the first interface member 2 is provided with a slot 14; thus, said lower portion 5 is subdivided into two resilient, tongue-shaped portions 9 and 10. One of these portions, i.e. the portion 10, is provided with a projection 11 in the form of a locking member.

The lower portion 5 is provided on both sides with a dimensionally stable lateral portion 12 which both serve for the fixing of the interface member 2. It must be noted that the entire first interface member 2 is dimensionally stable; thus, the cam members 8 maintain a predetermined position with reference to the lateral portions 12.

In FIGS. 4–6, there is shown the second interface member 3 of the mechanical interface assembly in a frontal view, in a side view and in a top view, respectively. This interface member 3 is designed as a supporting frame member 17 adapted to receive a container which will be further described herein below. The supporting frame member 17 is provided with positioning elements 20. The positioning elements 20 serve for the first interface member 2 to be coupled to the second interface member 3 in a well defined mutual positional relationship. Moreover, the supporting frame member 17 is provided with fixing elements 27, 28 by means of which the supporting frame member 17 can be coupled to a (not shown) coffee machine in a well defined position.

The supporting frame member 17 comprises a bottom plate member 30 and a lateral wall member 18. The side opposite to the lateral wall member 18 of the supporting frame member 17 is essentially open and is provided only in the region of its top a plate member 19. The top of the supporting frame member 21 is provided with an opening 21. At both sides of said opening 21, the elements 20 for fixing and positioning of the first interface member 2 are located; said elements 20 are of curved shape in the region of their front end. Moreover, there is provided an arc-shaped cover plate member 22 which follows the opening 21.

Both sides of the supporting frame member 17 are provided each with a bearing element 23 adapted to pivotally receive a closure shackle member. In order to bias the closure shackle member by means of a spring member, both sides of the supporting frame member 17 are provided with a shackle member 26 incorporating each a hook member 25 to which the free end of a spring member can be fixed. These spring members are not shown in the drawing for the sake of clarity.

The front end face of the supporting frame member 17 is provided with the already mentioned fixing elements 27, 28 by means of which the supporting frame member 17 can be fixed to and exactly positioned relative to a coffee machine. The bottom plate member 30 of the supporting frame member 17 is rounded in the region of its frontal end 31. Furthermore, there is provided a handle 32.

It is also possible to design said second interface member 3, e.g. the supporting frame member 17, as a part of a coffee machine. The interface member 3 either could be an integral part of the (not shown) coffee machine or could be designed as a plug-in module. Another possibility is to connect said second interface member 3 to the (not shown) coffee machine by means of rail members such that the second interface member can be drawn off out of the coffee machine to be loaded with a container receiving a plurality of single-portions of ground coffee arranged along a transporting tape.

FIG. 7 shows a portion 35 of a transportation tape 34 with a plurality of single-portions 36, 37 of ground coffee arranged along the transportation tape 34 in a top view. The free end, i.e. starting portion of the transportation tape 34 is designated with reference numeral 34A. The transportation tape 34 is of a one-piece design manufactured of a water-permeable material which is food compatible and preferably biologically disassembled. For instance, as a starting material, a cellulose material can be used for this purpose. The single-portions 36, 37 of ground coffee each are completely enclosed by the transporting tape 34. The transporting tape 34 is provided with a perforation 38 located between two adjacent single-portions 36, 37 of ground coffee.

As seen in the direction of movement of the transporting tape, in front of each single-portion 36, 37 of ground coffee, the transporting tape 34 is provided with apertures 39, 40 arranged in groups; thereby, a group 39A and 40A, respectively, of apertures 39 and 40, respectively, is assigned to a single-portion 36 and 37, respectively, of ground coffee. The apertures 39 and 40, respectively, of a group 39A and 40A, respectively, are in each case arranged along a straight line in a direction transverse to the longitudinal extension of the transporting tape 34.

In the drawing, nine apertures 39 and 40, respectively, of a group 39A and 40A, respectively are shown. Four thereof correspond with respect to their location with the cam members 8 (See FIGS. 1–3) provided on the rib members 6 of the first interface member 2. Behind each single-portion 36 and 37, respectively, of ground coffee, moreover, there is provided a circular opening 41 in the transporting tape 34 which allow the brewed coffee beverage to flow back through the transporting tape 34 into a (not shown) outlet of the coffee machine.

The weight of a single-portion 36, 37 of ground coffee usually is in the range between 6 and 9 grams. Thereby, it is possible without problems to provide transportation tapes 34 containing single-portions of coffee with different weight and/or different kinds of coffee, e.g. a first transportation tape containing single-portions of ground coffee with a weight of 6 grams for preparing a light coffee, a second transportation tape containing single-portions of ground coffee with a weight of 9 grams for preparing a strong coffee, and a third transportation tape containing single-portions of ground decaffeinated coffee. As will be further explained in detail herein after, the transportation tapes can easily and quickly be replaced in a coffee machine such that one can instantly switch from preparing e.g. a light coffee to preparing a strong coffee.

In the simplified schematic view according to FIG. 8, the essential parts and elements of a packaging unit 44 comprising a container member 45 and the first interface member 2 fixed thereto can be seen. The packaging unit 44 is shown in a longitudinal sectional view whereby also the single-portions 36, 37 of ground coffee contained on the transportation tape 34 described in connection with FIG. 7 herein before and received in the packaging unit 44 are evident. The single-portions 36, 37 of ground coffee are arranged, one behind the other one, along the transportation tape 34 and put into the container member 45 such that their lower sides face each other. In order to ensure a safe and reliable removal of the single-portions 36, 37 of coffee, one after the other one, the transportation tape is folded in a meander-like manner, as shown in FIG. 8.

The packaging unit 44 essentially comprises a container member 45, a first interface member 2 of the mechanical interface assembly as well as a plurality of single-portions 36, 37 of ground coffee connected to each other by means of a transportation tape 34. The packaging unit 44 as shown in FIG. 8 is in its storage condition, i.e. in a condition in which it can be stored for a prolonged period of time. For this purpose, the first interface member 2 of the mechanical interface assembly is displaced into a rest position, i.e. into the lower of two possible positions, such that the first interface member 2 essentially flushes with the top of the container member 45. Thus, the packaging unit 44 requires but little space and the first interface member 2 of the mechanical interface assembly is not freely exposed and, therefore subjected to the danger of damage.

In order to protect the single-portions 36, 37 of ground coffee received in the packaging unit 44 from the influences of oxygen and atmospheric humidity, the entire packaging unit 44 is enclosed and hermetically sealed by a multi-layer foil which is shown in FIG. 8 by broken lines 46; thus, the aroma and taste of the single-portions 36, 37 of ground coffee will not be impaired even during extended storage.

In order to bring the packaging unit 44, particularly the first interface member 2 of the mechanical interface assembly, into its operating position, first, the foil 46 is removed in the region of the first interface member 2. Thereafter, the first interface member 2 is pulled upwards to such an extent that its projection 11 engages a suitably located opening in the container member 45. The operating position of the first interface member 2 is shown in FIG. 8 in broken lines 2A.

Preferably, the container member 45 is provided with an insert made of stiff paper or cardboard in order to provide the container member 45 with the rigidity and stability required for the container member 45 to be reliably received in the second interface member 3 of the mechanical interface assembly and for the mutual fixing of the first interface member 2 and the second interface member 3. Stiff paper or cardboard is inexpensive in manufacturing and can be handled as waste without any problems.

The beginning 34A of the transportation tape 34 is hung in position by means of its apertures 39 (FIG. 7) engaging the cam members 8 provided at the upper portion 4 of the first interface member 2 of the mechanical interface assembly (FIG. 1). Thereby, it takes an unambiguous and well-defined position with reference to the packaging unit 44. In order to additionally fix the beginning 34A of the transportation tape 34 in its desired position during storage and handling of the packaging unit 44, there is provided a clamp member 15 pushed over the upper end portion 4 of the first interface member 2 and the beginning 34A of the transportation tape 34. Instead of using a clamp member 15, the transportation tape 34 can be fixed in position by slightly gluing its beginning 34A to the upper portion 4 of the first interface member 2.

Figure 9:
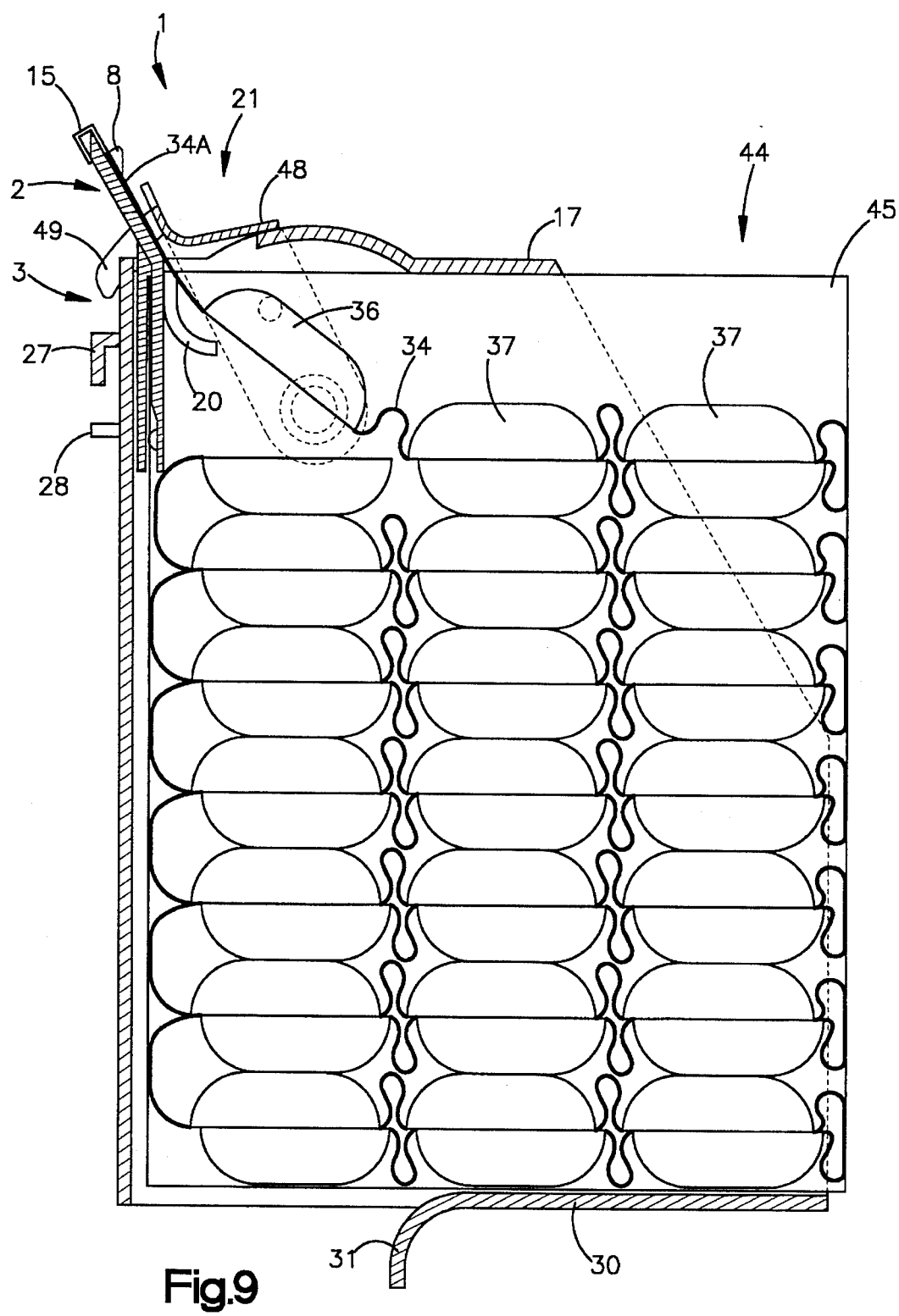
FIG. 9 shows a longitudinal sectional view of the second interface member and the container according to FIG. 8, whereby the latter one is inserted into said second interface member.

FIG. 9 shows a schematic longitudinal sectional view of the packaging unit 44 and of the mechanical interface assembly 1 constituted by the first and second interface members 2, 3 in the operating position. It can be seen in this drawing that the supporting frame member 17 is provided with a swivelably mounted closure shackle member 48 which is adapted to cover the opening 21 of the supporting frame member 17 serving for the removal of single-portions 36, 37 of ground coffee. The closure shackle member 48 is biased by means of two spring members, not shown in the drawing. By swiveling the closure shackle member 48 over its upper dead center, it can be displaced from an open position to a closed position and vice versa; under the influence of the two afore mentioned spring members, it is reliably held in its open and closed positions, respectively. The closure shackle member 48 is provided with two flap members 49, the distance there between being somewhat more than the width of the transportation tape 34; thus, the latter one is laterally guided by means of the two flap members 49.

In order to interconnect the two interface members 2, 3 to form the mechanical interface assembly, the packaging unit 44 is inserted into the supporting frame 17 in such a way that the two dimensionally stable lateral portions 12 (FIG. 1) of the first interface member 2 are located behind the two positioning elements 20 of the second interface member 3. Thereby, the position of the first interface member 2 is well defined with respect to the second interface member 3. Since the container member 45 rests on the bottom plate member 30 and thanks to the stiffness of the container member 45, it is ensured that the two dimensionally stable lateral portions 12 (FIG. 1) are pressed against an upper stop portion of the supporting frame member 17 and fixed in this position. However, prior to inserting the packaging unit 44 into the supporting frame member 17, it is to be recommended to displace the closure shackle member 48 into its open operating position. After the two interface members 2, 3 having been coupled to each other, the supporting frame member 17 and, thereby, the packaging unit 44 with the entire mechanical interface assembly 1 can be fixed to a (not shown) coffee machine with the help of the positioning and fixing elements 27, 28.

The take-out of an individual single-portion 36, 37 of ground coffee from the packaging unit 44 is performed by a catch element of the coffee machine (not shown) as follows:

A catch element of the coffee machine (both not shown in the drawings) is provided with five projections corresponding in size and mutual location with the apertures 39, 40 provided in the transportation tape 34. The projections of the catch element engages free apertures 39 provided in the transportation tape 34 through the recesses 7 of the first interface member 2 (FIG. 1, 3), slightly raises the transportation tape 34 and pulls the latter one, together with the first single-portion 36 of ground coffee, over the cam members 8 out of the packaging unit 44. Thereby, the closure shackle member 48 is pushed back, against the force of the (not shown) spring members and automatically closes the opening 21 again as soon as the first single-portion 36 of ground coffee is removed from the packaging unit 44. Thus, the single-portions 37 of coffee still remaining in the packaging unit 44 are protected quite well against detrimental atmospheric influences. If the beginning 34A of the transportation tape 34 is fixed by means of a clamp member 15, it is understood that this clamp member 15 must be removed prior to inserting the packaging unit 44 into the supporting frame member 17. If, however, the beginning portion 34A of the transportation tape 34 is slightly glued to the first interface member 2, no special measures have to be taken.

During the removal of the first single-portion 36 of ground coffee, the transportation tape 34 glides over the cam members 8 until the next row 40A of apertures 40 (FIG. 7) provided in front of the next single-portion 37 of ground coffee has reached the cam members 8. Then, the cam members 8 engage the apertures 40 provided in the transportation tape 34 with the result that the transportation tape is stopped and fixed in position again. A reliable engagement of the cam members 8 in the apertures 40 is supported by the spring biased closure shackle member 48. Thereafter, the transportation tape 34 is cut off along the perforation 38. Thereby, the transportation tape 34 is fixed in the region of the cam members 8 preferably by (not shown) means provided in the coffee machine and the pulled out first singe-portion 36 of ground coffee is separated from the remainder of the transportation tape by pulling at the beginning 34A of the transportation tape 34. The cutting off operation is supported by the acute edge portion 13 at the upper end of the rib members 6 of the first interface member 2 as the perforation 38 rests on this acute edge portion 13 when the pulled out first single-portion 36 of ground coffee has to be separated from the remainder of the transportation tape 34. It is understood that the coffee machine to be used could also be provided with means for fixing and/or cutting off a portion of the transportation tape 34.

The rounded front portion 31 of the bottom plate member 30 of the supporting frame member 17 facilitates the exchange of the packaging unit 44. Simultaneously, the rounded front portion 31 can be used as a stop member or as a fixing element at the insertion of the supporting frame member 17 into a coffee machine.

A great advantage of the mechanical interface assembly 1 described herein before may be seen in the fact that the container member 45 is immediately closed again as soon as a single-portion of ground coffee has been removed from the container member 45, and that the transportation tape 34 is cut off. Thereby, it is possible to remove the packaging unit 44 received in the supporting frame member 17 at any time from the coffee machine and to replace it by an other one. In this way, the kind or sort of coffee can be changed at any time, independently of the number of single-portions 37 of ground coffee still remaining in the packaging unit 44.

According to another embodiment not shown in the drawings, it is also possible to provide the first interface member 2 with positioning and/or fixing elements with the result that the packaging unit 44 can be directly coupled to the coffee machine without the need to provide a supporting frame member 17.

It is further to be noted that the closure shackle member 48 could be provided with cam members (not shown) for fixing the transportation tape 34, exclusively or additionally to the cam members 8 provided on the first interface member 2.

Finally, it should be pointed out that the embodiment described herein before represents only one of several possible modes of execution of the invention. Any person skilled in the art may realize other embodiments of mechanical interface assemblies, of packaging units comprising a mechanical interface member and of transportation tapes within the scope of the appended claims.

What is claimed is:

1. A mechanical interface assembly to serve as an interface between a transportation tape, provided with a plurality of single-portions of ground coffee and received in a container means, and a tape driver means of a coffee machine, said mechanical interface assembly comprising:

means for fixing a portion of said transportation tape and for positioning said portion of said transportation tape in a well defined position relative to said mechanical interface assembly;

a dimensionally stable lateral portion provided with positioning and/or fixing elements for definedly positioning said mechanical interface assembly and, thereby, said portion of said transportation tape with reference to said coffee machine; and means on said mechanical interface assembly for engaging said container means and for fixing said mechanical interface assembly to said container means.

2. A mechanical interface assembly according to claims 1 in which said mechanical interface assembly comprises a first interface member and a second interface member, said first and second interface members being adapted to be coupled to each other in a well defined position.

3. A mechanical interface assembly according to claim 2 in which said first interface member is adapted to be fixed to a container means receiving said transportation tape and said single-portions of ground coffee provided on said transportation tape.

4. A mechanical interface assembly according to claim 3 in which said first interface member comprises a slot means forming in said first interface member two tongue members such that said first interface member can be slidably mounted to said container means.

5. A mechanical interface assembly according to claim 4 in which at least one of said two tongue members is provided with a projection by means of which said first interface member can be locked in an operating position on said container means, said container means being provided with a locking aperture which engages said projection when said first interface means is in said operating position.

6. A mechanical interface assembly according to claim 2 in which said second interface member comprises a dimensionally stable supporting frame member which is provided with positioning elements to which said first interface member may be coupled in a well defined position.

7. A mechanical interface assembly according to claim 2 in which said second interface member is movable or fixedly connected to a coffee machine.

8. A mechanical interface assembly according to claim 2 in which said first interface member and/or said second interface member is/are provided with positioning means for definedly positioning and fixing said mechanical interface assembly with reference to a coffee machine.

9. A container member adapted to cooperate with a mechanical interface assembly adapted to serve as an interface between a coffee machine and a transportation tape equipped with a plurality of single-portions of ground coffee, said mechanical interface assembly comprising means for fixing a positioning a portion of said transportation tape in a well defined position relative to said mechanical interface assembly, in which said container member is adapted to receive a plurality of single-portions of ground coffee connected to each other by means of a transportation tape, said container member comprising a removal aperture for removing a single-portion of ground coffee from the container member when it is in its operative condition, whereby at least said means for fixing and positioning of a portion of the transportation tape provided on said mechanical interface assembly are located in the region of said removal aperture when said mechanical interface assembly cooperates with said container member.

10. A container member according to claim 9 in which said mechanical interface assembly comprises a first interface member and a second interface member, whereby said first interface member is mounted on said container member such that said first interface member can be displaced from a rest position not an operative position and locked in said operative position, whereby said first interface member, being in its rest position, does not or essentially not project over said container member, and whereby said first interface member and the means for fixing of said portion of said transportation tape, respectively, project over said container member when said first interface member is in its operative position.

11. A container member according to claim 10 in which said container member is provided with a locking aperture adapted to engage said projection provided on one of said tongue members of said first interface member when said first interface member is in its operating position.

12. A container member according to claim 10, further comprising means for stabilizing the shape of said container member.

13. A container member according to claim 9 in which the beginning of said transportation tape engages said positioning and fixing means provided on said mechanical interface assembly.

14. A container member according to claim 13 in which said beginning of said transportation tape is additionally fixed by means of a clamp member or by means for increasing the adhesion between said transportation tape and said first interface member, e.g. an adhesive.

15. A container member according to claim 9, further comprising a foil means enclosing said container member and hermetically sealing the interior thereof.

16. A transportation tape equipped with a plurality of single-portions of ground coffee, adapted to cooperate with a mechanical interface assembly serving as an interface between a coffee machine and said transportation tape, said mechanical interface assembly comprising means for fixing and positioning a portion of said transportation tape in a well defined position relative to said mechanical interface assembly, said transportation tape being adapted to be received in a container member comprising a removal aperture for removing a single-portion of ground coffee from the container member when it is in its operative condition, whereby at least said means for fixing and positioning of a portion of the transportation tape provided on said mechanical interface assembly are located in the region of said removal aperture when said mechanical interface assembly cooperates with said container member, said transportation tape comprising a plurality of apertures arranged in groups, each one of said groups of apertures being assigned to one single-portion of ground coffee.

17. A transportation tape according to claim 16 in which the apertures in each of said groups of apertures are arranged along a straight line running perpendicular to the longitudinal extension of said transportation tape.

18. A transportation tape according to claim 16, further comprising perforations between each two adjacent single-portions of ground coffee.

19. A transportation tape according to claim 16 in which the number of apertures in a group of apertures is higher than the number of cam members provided on said first interface member.

20. A transportation tape according to claim 16, further comprising, assigned to each single-portion of ground coffee, a further aperture, preferably of circular shape.

21. A transportation tape according to claim 16 which is of a one-piece design, whereby the single-portions of ground coffee are enclosed by said transportation tape.

22. A transportation tape according to claim 16 in which the weight of a single-portion of ground coffee is in the region between 6 and 9 grams.

23. A transportation tape according to claim 16 which is water permeable at least in the region of the single-portions of ground coffee.

24. A transportation tape according to claim 16 which is made of a food compatible material which is biologically disposable.

25. A mechanical interface assembly to serve as an interface between a transportation tape, provided with a plurality of single-portions of ground coffee and received in a container means, and a tape driver means of a coffee machine, said transportation tape having a plurality of apertures, said mechanical interface assembly comprising:

means for fixing a portion of said transportation tape and for positioning said portion of said transportation tape in a well defined position relative to said mechanical interface assembly, said means including a plurality of cam members to cooperate with said plurality of apertures provided in said transportation tape;

a dimensionally stable lateral portion provided with positioning and/or fixing elements for definedly positioning said mechanical interface assembly and, thereby, said portion of said transportation tape with reference to said coffee machine; and means on said mechanical interface assembly for engaging said container means and for fixing said mechanical interface assembly to said container means.

26. A mechanical interface assembly according to claim 25 in which said mechanical interface assembly comprises a plurality of rib members separated from each other by recesses, at least some of said rib members being provided each with one of said cam members such that a catch member of a coffee machine can engage free apertures in said transportation tape.

27. A mechanical interface assembly according to claim 26, further comprising a spring biased closure means adapted to cover an aperture through which the transportation tape and the single-portions of ground coffee pass.

28. A mechanical interface assembly according to claim 27 in which said closure means is provided with two integrally formed flap members, the distance between said flap members essentially corresponding to the width of said transportation tape such that the latter one is laterally guided by means of said flap members.

29. A mechanical interface assembly according to claim 27 in which said closure means supports the fixing of said transportation tape in said well defined position when said closure means is in its closed position.

30. A mechanical interface assembly according to claim 27 in which said closure means is swivelably mounted on said second interface member.

31. A mechanical interface assembly according to claim 25 in which said cam members are arranged in a row along a straight line running perpendicular to the longitudinal extension of said transportation tape, and in which the distance between two adjacent cam members corresponds to twice the distance between two adjacent apertures provided in said transportation tape.

* * * * *

UNITED STATES PATENT AND TRADEMARK OFFICE
CERTIFICATE OF CORRECTION

PATENT NO.  : 5,555,790
DATED       : September 17, 1996
INVENTOR(S) : Anton Ackermann It is certified that error appears in the above-indentified patent and that said Letters Patent is hereby corrected as shown below:

Column 11, line 17, change "a" (first occurence) to --and--.

Column 11, line 35, change "not" to --into--.

Column 11, line 48, change "10" to --9--.

Signed and Sealed this

First Day of July, 1997

Attest:

BRUCE LEHMAN

Attesting Officer

Commissioner of Patents and Trademarks